(12) United States Patent
Grigoryan et al.

(10) Patent No.: US 10,404,789 B2
(45) Date of Patent: Sep. 3, 2019

(54) SYSTEMS, METHOD, AND NON-TRANSITORY COMPUTER-READABLE STORAGE MEDIA FOR GENERATING CODE FOR DISPLAYING A WEBPAGE

(71) Applicant: Wal-Mart Stores, Inc., Bentonville, AR (US)

(72) Inventors: Alexander Grigoryan, San Jose, CA (US); Xiuhao Joel Chen, San Ramon, CA (US); Arpan Y. Nanavati, Castro Valley, CA (US); Caoyang Shi, San Jose, CA (US); Naga Viswanathan Malepati, San Marcos, CA (US); Maxime Najim, Carlsbad, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 181 days.

(21) Appl. No.: 15/415,656

(22) Filed: Jan. 25, 2017

(65) Prior Publication Data
US 2018/0210866 A1    Jul. 26, 2018

(51) Int. Cl.
G06F 9/44      (2018.01)
H04L 29/08     (2006.01)
G06F 16/95     (2019.01)
G06F 16/2455   (2019.01)

(52) U.S. Cl.
CPC .... *H04L 67/1002* (2013.01); *G06F 16/24552* (2019.01); *G06F 16/95* (2019.01); *H04L 67/02* (2013.01)

(58) Field of Classification Search
CPC ..... G06F 8/34; G06F 8/30; G06F 8/20; G06F 8/71; G06F 8/36
USPC ......................................... 717/107, 130, 158
See application file for complete search history.

(56) References Cited

U.S. PATENT DOCUMENTS

| | | |
|---|---|---|
| 6,654,784 B1 | 11/2003 | Wei |
| 7,921,353 B1 | 4/2011 | Murray |
| 8,245,125 B1 | 8/2012 | Pupius et al. |
| 8,719,451 B1 | 5/2014 | Colton et al. |
| 8,914,774 B1 | 12/2014 | Colton et al. |
| 8,954,989 B1 | 2/2015 | Colton et al. |
| 8,994,967 B1 | 3/2015 | Mayers et al. |
| 9,122,650 B1 | 9/2015 | Colton et al. |
| 9,223,599 B1 | 12/2015 | Racanelli et al. |
| 9,229,702 B1 * | 1/2016 | Kapulkin .................. G06F 8/65 |
| 9,602,574 B1 | 3/2017 | Mocanu et al. |

(Continued)

*Primary Examiner* — Chuck O Kendall
(74) *Attorney, Agent, or Firm* — Bryan Cave Leighton Paisner LLP

(57) ABSTRACT

A system for use in displaying a webpage is described herein. The system includes a database and a server computer. The database includes a plurality of software components associated with a webpage. The server computer is configured to access the database and retrieve the plurality of software components and execute a profiling operation including rendering each of the plurality of software components and determining a rendering period associated with each software component. The server computer is also configured to select a cacheable software component from the plurality of software components as a function of the associated rendering periods, generate rendered cache code for the selected cacheable software component, and store the rendered cache code in the database for use in generating the webpage.

20 Claims, 13 Drawing Sheets

(56) References Cited

U.S. PATENT DOCUMENTS

| | | |
|---|---|---|
| 9,870,428 B2 | 1/2018 | Jellick et al. |
| 9,900,369 B2 | 2/2018 | Afzal |
| 2006/0048135 A1 | 3/2006 | Hodson et al. |
| 2006/0248166 A1 | 11/2006 | Milosevic et al. |
| 2008/0184199 A1 | 7/2008 | Fried et al. |
| 2009/0287657 A1 | 11/2009 | Bennett |
| 2010/0269046 A1 | 10/2010 | Pahlavan et al. |
| 2014/0181788 A1 | 6/2014 | Sullivan et al. |
| 2014/0281918 A1 | 9/2014 | Wei et al. |
| 2014/0289360 A1 | 9/2014 | Mahkovec et al. |
| 2014/0297711 A1 | 10/2014 | He |
| 2014/0303934 A1 | 10/2014 | Mylarappa et al. |
| 2014/0325337 A1 | 10/2014 | McWeeney |
| 2014/0344664 A1 | 11/2014 | Bleakley et al. |
| 2014/0344666 A1 | 11/2014 | Bleakley et al. |
| 2015/0046789 A1 | 2/2015 | Wei et al. |
| 2015/0088968 A1 | 3/2015 | Wei et al. |
| 2015/0120804 A1 | 4/2015 | Eschbach |
| 2016/0012111 A1 | 1/2016 | Pattabhiraman et al. |
| 2016/0012144 A1 | 1/2016 | Benjamin |
| 2016/0012145 A1 | 1/2016 | Benjamin |
| 2016/0344832 A1 | 11/2016 | Kukreja et al. |
| 2017/0169001 A1 | 6/2017 | D'Aurelio et al. |
| 2017/0192799 A1 | 7/2017 | Wherry et al. |
| 2017/0220306 A1 | 8/2017 | Price et al. |
| 2017/0310791 A1 | 10/2017 | Palse et al. |
| 2017/0364485 A1 | 12/2017 | Kidambi et al. |
| 2018/0034721 A1 | 2/2018 | Dunn et al. |
| 2018/0088744 A1 | 3/2018 | Lin et al. |
| 2018/0121401 A1 | 5/2018 | Wei et al. |
| 2018/0210866 A1* | 7/2018 | Grigoryan ......... G06F 16/24552 |

\* cited by examiner

```
import SSRCaching from "electrode-react-ssr-caching";
import { renderToString } from "react-dom/server";
import MyComponent from "mycomponent";

// first you should render your component in
// a loop to prime the JS engine (i.e: V8 for NodeJS)
for( let i = 0; i < 10; i ++ ) {
    renderToString(<MyComponent />);
}

SSRCaching.clearProfileData();
SSRCaching.enableProfiling();
const html = renderToString(<MyComponent />);
SSRCaching.enableProfiling(false);
console.log(JSON.stringify(SSRCaching.profileData, null, 2));
```

FIG. 7

```
const cacheConfig = {                  /— 80
  components: {
    Component1: {
      strategy: "simple",
      enable: true,
      genCacheKey: (props) => JSON.stringify(props)
    }
  }
};
```

FIG. 8A

```
                              /— 28
class Hello extends Component {
  render() {
    return <div>Hello, {this.props.name}. {this.props.message}</div>
  }
}
```

FIG. 8B

```
                         /— 82
const props = { name: "Bob", message: "How're you?" }
```

FIG. 8C

```
                    /— 68    /— 70
<div>Hello, <span>Bob</span>. <span>How're you?</span></div>
```

FIG. 8D

```
Code
const cacheConfig = {
    components: {
        Hello: {
            strategy: "template",
            enable: true,
            preserveKeys: [ "key1", "key2" ],
            preserveEmptyKeys: [ "key3", "key4" ],
            ignoreKeys: [ "key5", "key6" ],
            whitelistNonStringKeys: [ "key7", "key8" ]
        }
    }
};
```
← 84

SYSTEMS, METHOD, AND NON-TRANSITORY COMPUTER-READABLE STORAGE MEDIA FOR GENERATING CODE FOR DISPLAYING A WEBPAGE

FIELD OF THE DISCLOSURE

U.S. Patent Classification Primary Class: 707 (DATA PROCESSING: DATABASE, DATA MINING, AND FILE MANAGEMENT OR DATA STRUCTURES. Art Unit: 2161.

The present invention relates to software components, and more particularly, to systems, methods, and computer-readable storage media for use in displaying a webpage.

BACKGROUND

Many consumers desire to order items or goods remotely, e.g., on-line, through the Internet, or using a specially designed application or app on a personal computer or mobile device, such as a tablet or cell phone. At least some known website hosting systems include search engines that allow consumers to enter search criteria and generate search results based on the consumer's search criteria. Known search engines may generate and display product lists to consumers via a website including products that are selected based on the search criteria.

At least some known websites receive a significant number of monthly visitors with page loads up to 10,000 requests per second. In addition, at least some e-commerce websites add more than one million new items each month, which requires the development of new webpages and website capabilities to support user access to the additional items.

Developing new webpages and functionality to support the additional products and to utilize emerging user technologies presents significant challenges to organizations responsible for developing new websites and website functionality. Accordingly, it is desired to provide an improved computer server system that supports the development of software applications that are consistent, reliable, and follow the most scalable development practices, as well as support consistent webpage builds and deployments across projects.

The present invention is aimed at one or more of the problems identified above.

SUMMARY OF THE INVENTION

In different embodiments of the present invention, systems, methods, and computer-readable storage media implement a server computer system for displaying a webpage on a client computing device.

In one embodiment of the present invention, one or more non-transitory computer-readable storage media, having computer-executable instructions embodied thereon are provided. When executed by at least one processor, the computer-executable instructions cause the processor to access a database and retrieve a plurality of software components associated with a webpage and execute a profiling operation including rendering each of the plurality of software components and determining a rendering period associated with each software component. The computer-executable instructions also cause the processor to select a cacheable software component from the plurality of software components as a function of the associated rendering periods, generate rendered cache code for the selected cacheable software component, and store the rendered cache code in the database for use in generating the webpage.

In another embodiment of the present invention, a computer-implemented method for operating a server computer system for use in displaying a webpage on a client computing device is provided. The method includes the server computer performing the steps of accessing a database and retrieve a plurality of software components associated with a webpage and executing a profiling operation including rendering each of the plurality of software components and determining a rendering period associated with each software component. The method also includes the server computer selecting a cacheable software component from the plurality of software components as a function of the associated rendering periods, generating rendered cache code for the selected cacheable software component, and storing the rendered cache code in the database for use in generating the webpage.

In yet another embodiment of the present invention, a system for use in displaying a webpage is provided. The system includes a database and a server computer including a processor. The database includes a plurality of software components associated with a webpage. The processor is configured to access the database and retrieve the plurality of software components and execute a profiling operation including rendering each of the plurality of software components and determining a rendering period associated with each software component. The processor is also configured to select a cacheable software component from the plurality of software components as a function of the associated rendering periods, generate rendered cache code for the selected cacheable software component, and store the rendered cache code in the database for use in generating the webpage.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIG. 7 is an illustration of exemplary component profiling computer code generated by the system shown in FIGS. 1-2, according to embodiments of the present invention;

FIGS. 8A-8D are illustrations of exemplary component caching computer code generated by the system shown in FIGS. 1-2, according to embodiments of the present invention;

FIGS. 9A-9E are illustrations of exemplary component caching computer code generated by the system shown in FIGS. 1-2, according to embodiments of the present invention;

Figure 1:
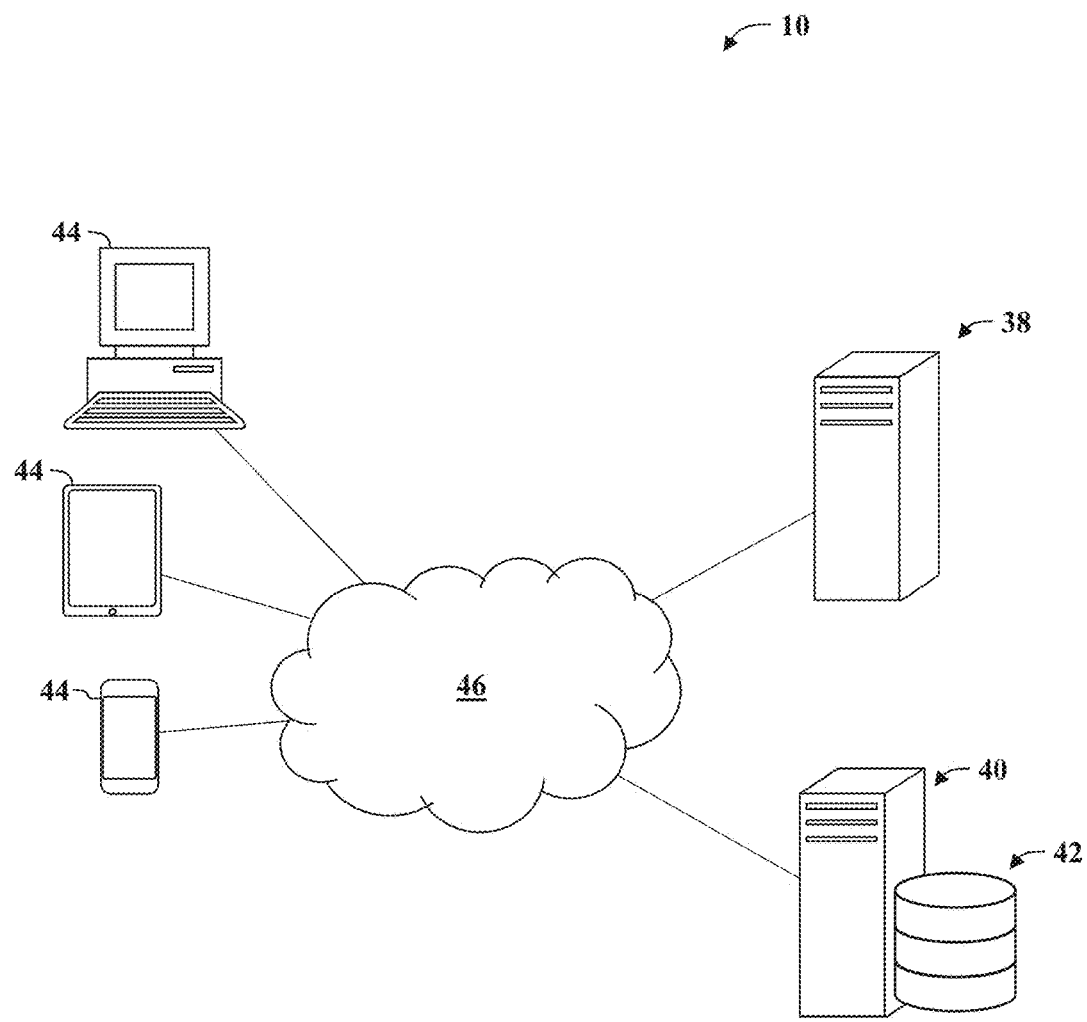
FIG. 1 is a schematic illustrating various aspects of a system, according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

In general, the system 10 is configured to execute a software program, Electrode™, that is a platform for building universal React/Node.js applications with a standardized structure that follows best practices and has modern technologies baked in. The software program Electrode™ focuses on performance, component reusability and simple deployment to multiple cloud providers—so you can focus on what makes your app unique. Electrode™ enables the system to build a flexible and universal React/Node.js application, with support for server-side rendering and easy deployment. Use Electrode to start new projects quickly with a simple, consistent structure that follows modern best practices. The Electrode platform is managed by the Electrode Archetype System, which allows for a standardized configuration, structure and workflow throughout the entire application. By enforcing a sensible structure and consistency for components, modules and the entire app, Electrode's Archetype system helps you build scalable applications you can trust while ensuring streamlined development and deployment.

For example, Walmart.com™ at Scale: In the illustrated embodiment, 80 million monthly visitors, loads up to 10,000 requests per second, and 15 million items, adding more than one million new items each month is what Walmart.com's™ scale is all about. With a large e-commerce business, it is desired to scale Walmart.com™ and to leverage the talent and creativity of the engineering base.

Core Goals: In e-commerce development, platform migration is serious business. Technology evolves constantly and it's important to move and adapt to stay competitive. However, transforming an engineering organization is a completely different story. With over a few hundred engineers, and dozens of applications, a system including the Electrode™ platform was developed to solve core problems that every large scale organization faces including streamlined development cycles, structure and best practices, and software code reuse:

Streamlined Development Cycle—it is desired to have developers to on-board and start new projects quickly to realize the end goal of reduced time to market. When starting a new application, there are a lot of technologies and configurations that developers have to glue together (such as rendering on the server side, redux, webpack configs, css modules, post css, deployment scripts, internationalization, javascript/css linting, karma/mocha configs, code coverage configs, etc). To jump start new applications, it is desired to combine all of that in one easy to use package with a scalable structure that follows best practices. This way the Electrode™ system allows developers to focus their attention on building features that customers want.

Structure and Best Practices—With hundreds of engineers across dozens of teams, it is desired to ensure that all of the applications are consistent and reliable, and follow the most scalable development practices. It is also needed to focus results in consistent builds and deployments across projects, along with great scaffolding to start developers off on the right path. Electrode's™ predefined archetype system provides best practices and structures for building scalable applications that can be trust.

Code Reuse—Sharing React™ software components across projects and brands improves productivity—but only if developers can find the software components and trust their quality and consistency. Electrode's™ archetypes ensure consistent structure, and tools like Electrode Explorer™ make it easy to search through thousands of components to find what is needed.

Performance/Universal JavaScript—Server side rendering (SSR) makes a difference to performance and search engine optimization, so Electrode™ supports it out of the box. In addition, there is an opportunity to push the boundaries of performance even further, so Electrode™ was developed to include Caching and Profiling, Above the Fold Render, and Redux Router Engine.

One of the most frequently touted benefits of Facebook's React™ library is that its component model encourages code reuse. React™ is a JavaScript library for building user interfaces (UI). Declarative views make the code more predictable and easier to debug. React™ allows developers to build encapsulated software components that manage their own state, then compose those encapsulated software components to make complex UIs. Since component logic is written in JavaScript instead of templates, it can easily pass rich data through the application and keep state out of the DOM. A Simple Component, React™ components implement a render( ) method that takes input data and returns what to display. React software components let you split the UI into independent, reusable pieces, and think about each piece in isolation. Conceptually, components are like JavaScript functions. They accept arbitrary inputs (called "props") and return React elements describing what should appear on the screen.

Figure 5:
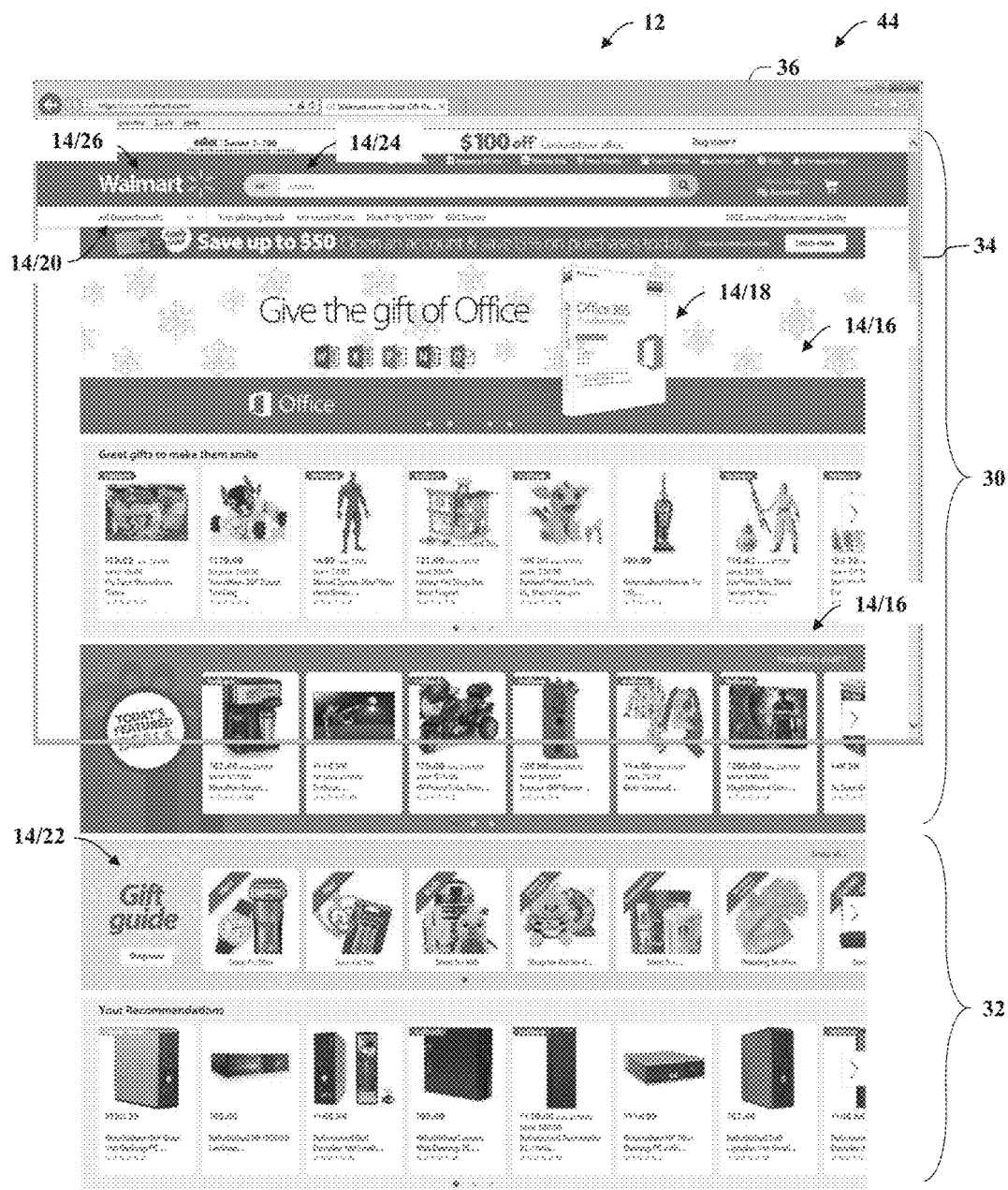
FIG. 5 is an illustration of an exemplary screenshot that may be generated by the system shown in FIGS. 1-2, according to embodiments of the present invention.
Figure 6:
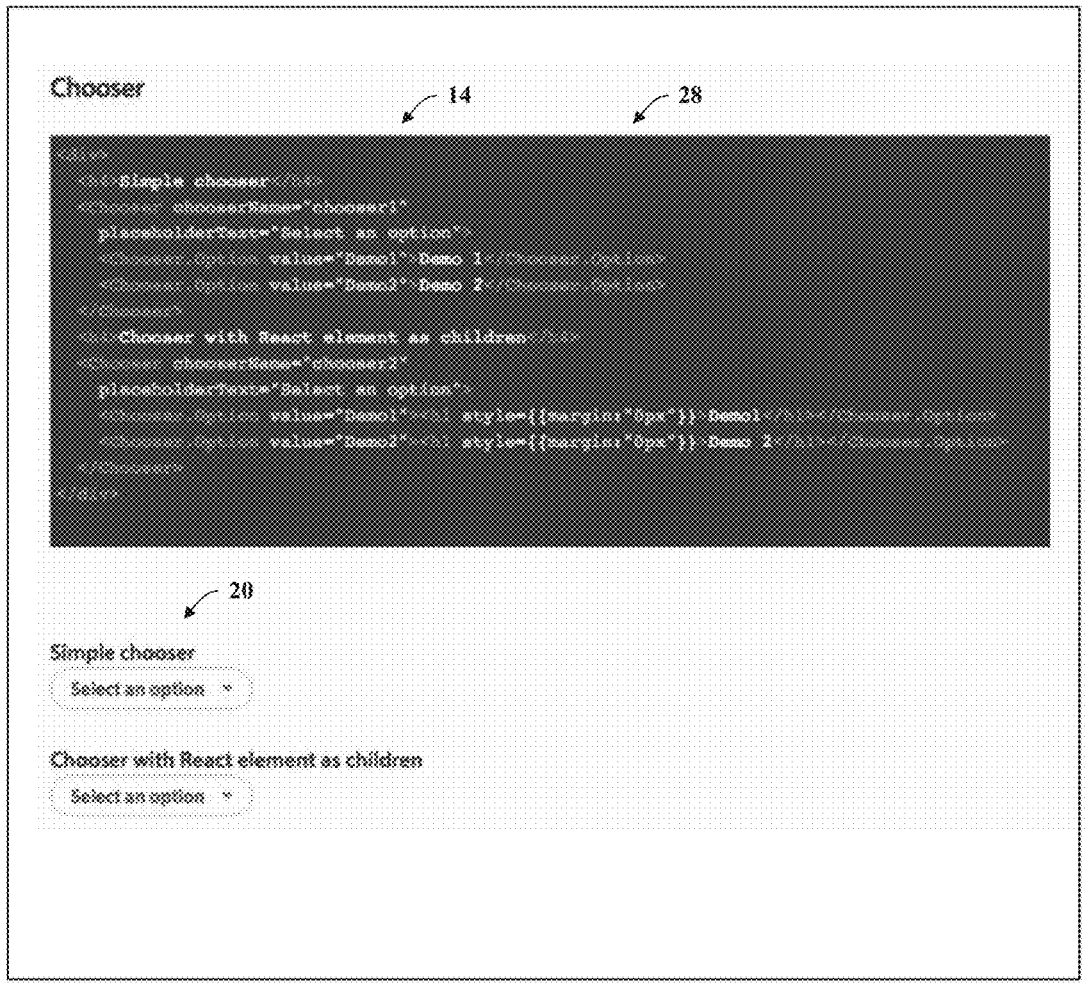
FIG. 6 is an illustration of exemplary software component computer code generated by the system shown in FIGS. 1-2, according to embodiments of the present invention.

On a large scale, this means sharing software components across applications—for example, using a software component that generates a login box on a standalone login page and on a checkout page. With reference to FIG. 5, in one embodiment, for example, the system 10 may be configured to generate and display a webpage 12 that is composed of a plurality of software components 14 for use in generating webpage elements such as, for example, product carousels 16 displaying images of products 18, a chooser menu 20 that enables a user to select product categories to refine a product search, a product display 22 that displays product information in response to a product search request, a search field 24 that allows a user to input search terms for use by the system 10 to search and display relevant product information, a logo frame 26 that displays a brand logo image, etc. When implemented well, this code reuse can result in faster development time and fewer bugs. For example, FIG. 6 illustrates an example of the React™ component code 28 that may be used to generate the chooser menu 20 being displayed with the webpage 12 shown in FIG. 5. In addition, the system 10 may be configured generate and display the webpage 12 including a plurality of first display images 30 and a plurality of second display images 32. The plurality of first images 30 include those webpages elements that appear within an above-the-fold area 34 that appears when the webpage is initially displayed in a web-browser window 36 of a client computing device. The plurality of second images 32 include those webpage elements that may appear as the user scrolls through the webpage to view other areas of the webpage that are outside of the above-the-fold area 34 and not initially displayed by the web-browser program.

In the illustrated embodiment, the system 10 is configured to execute the Electrode™ software program to improve react server side render performance by up to 70% over known computer rendering programs. The Electrode™ software program includes a react/node.js application platform that powers walmart.com with several goals in mind, including ease of use, re-usability of components across applications and, most importantly, performance. In one embodiment, server side rendering includes a process where the initial request loads the page, layout, CSS, JavaScript and content. For subsequent updates to the page, the client-side rendering approach repeats the steps it used to get the initial content. The Electrode™ software program enables server side rendering two reasons: 1) Improved performance for the customer; and 2) Better for Search Engine Optimization.

Figures 9B, 9C, 9D, 9E:
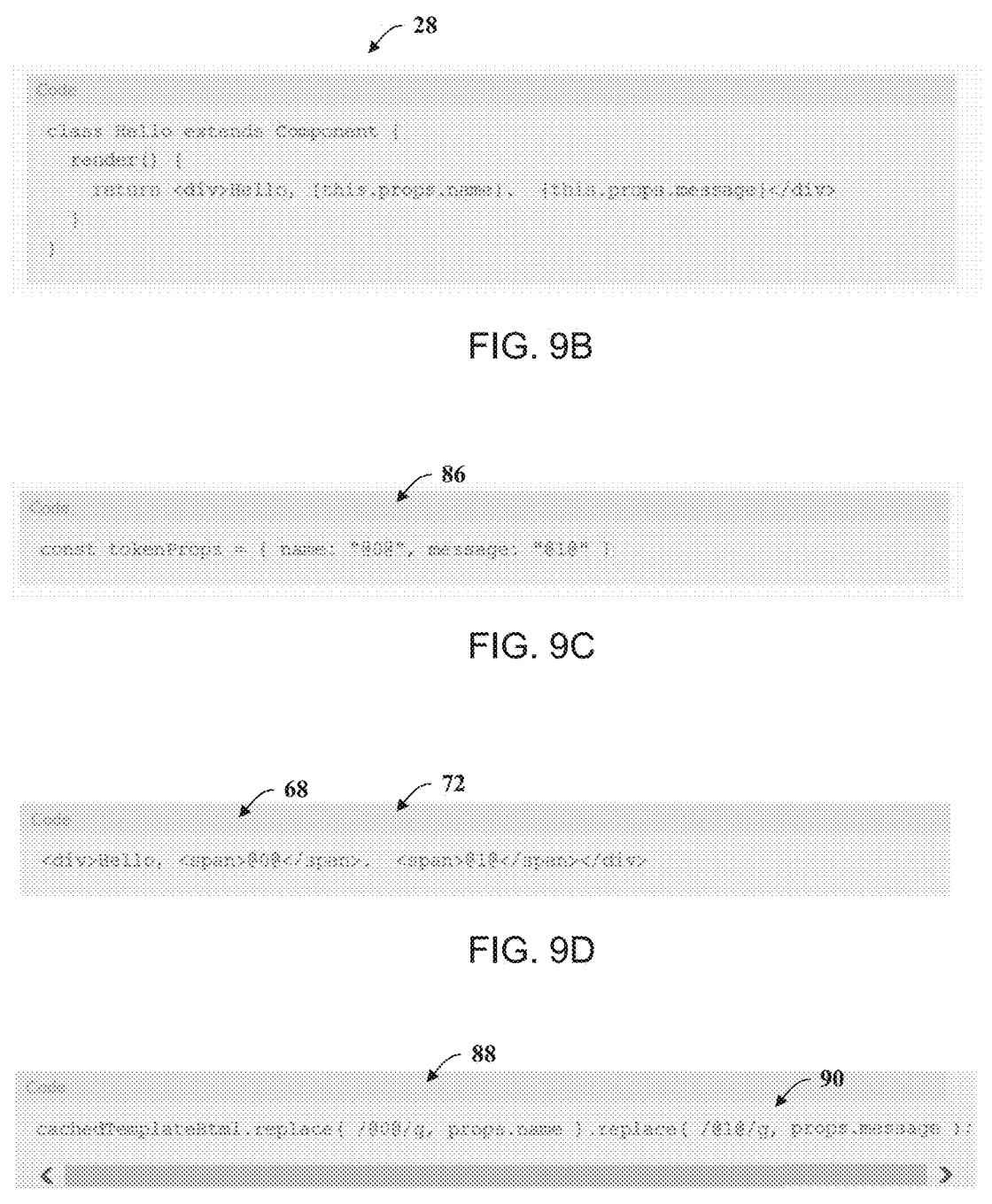

In the illustrated amendment, the system 10 includes an electrode-react-ssr-caching module that is configured to optimize React component server side rendering with profiling and software component caching. The electrode-react-ssr-caching module supports profiling React server side rendering time to enable component caching to help speed up server side rendering of software components associated with webpages. The electrode-react-ssr-caching module can be used a standalone module and is agnostic of web-server framework. The electrode-react-ssr-caching module may be used with Electrode™, Express.js and Hapi.js applications. In the illustrated embodiment, the electrode-react-ssr-caching module includes a profiling module that is configured to execute profiling software code (shown in FIG. 7) and a caching module that is configured to execute caching software code (shown in FIGS. 8A and 9A). The profiling module enables the system 10 to determine the time required to render a software component 14. The caching module enables the system 10 to cache a software component 14 to speed up server-side-rendering performance.

Referring to FIG. 1, in the illustrated embodiment, the system 10 includes a website hosting server 38, a software component database server 40, a software component database 42, and one or more client computing devices 44 that are each coupled in communication via a communications network 46. The communications network 46 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed. Each server may include one or more server computers that each include a processing device that includes a processor that is coupled to a memory device. The processing device executes various programs, and thereby controls components of the server according to user instructions received from the client computing devices and/or other servers. The processing device may include memory, e.g., read only memory (ROM) and random access memory (RAM), storing processor-executable instructions and one or more processors that execute the processor-executable instructions. In embodiments where the processing device includes two or more processors, the processors can operate in a parallel or distributed manner. The processing device may also include a memory device for storing programs and information in one or more databases, and retrieving information from the databases that is used by the processor to perform various functions described herein. The memory device may include, but is not limited to, a hard disc drive, an optical disc drive, and/or a flash memory drive. Further, the memory device may be distributed and located at multiple locations.

The client computing device 44 may include any suitable device that includes a display device configured to display websites to the user and a user input device, such as, for example, a keyboard and/or mouse, that enables a user to access and communicate with the system 10 including sending and/or receiving information to and from the system 10 and displaying information received from the system 10 to a user. The client computing device 44 may include a processing device that includes a processor that is coupled to a memory device. The processing device executes various programs, and thereby controls components of the client computing device 44 according to user instructions received via the user input device and/or server computers. For example, in one embodiment, the client computing device 44 may include, but is not limited to, a desktop computer, a laptop or notebook computer, a tablet computer, smartphone/tablet computer hybrid, a personal data assistant, a handheld mobile device including a cellular telephone, and the like. In addition, the client computing device 44 may include a touchscreen that operates as the display device and the user input device. In the illustrated embodiment, the client computing device 44 includes a web-browser program that is stored in the memory device. When executed by the processor of the client computing device, the web-browser program enables the client computing device to receive software code from the website hosting server 38 including, but not limited to HTML, JavaScript, cascade style sheets (CSS), and any suitable programming code that enables the client computing device 44 to generate and display a website and/or webpages on the display device of the client computing device. The web-browser program also enables the client computing device 44 to receive instructions from the website hosting server 38 that enable the client computing device 44 to render HTML code for use in generating and displaying portions of the website and/or webpage.

The software component database server 40 includes a memory device that is connected to the software component database 42 to retrieve and store information contained in the software component database 42. The software component database 42 contains information on a variety of matters, such as, for example, information associated with webpages associated with one or more websites, software components, demonstration files, source code, integration code, object data, product images, product information, and/or any suitable information that enables the system 10 to function as described herein. The data and/or records contained in the component database 42 may include searchable data terms including characters, symbols, letters, numbers, words, phrases, images, text data files, video data files, image data files, audio data files, and the like.

Figure 12:
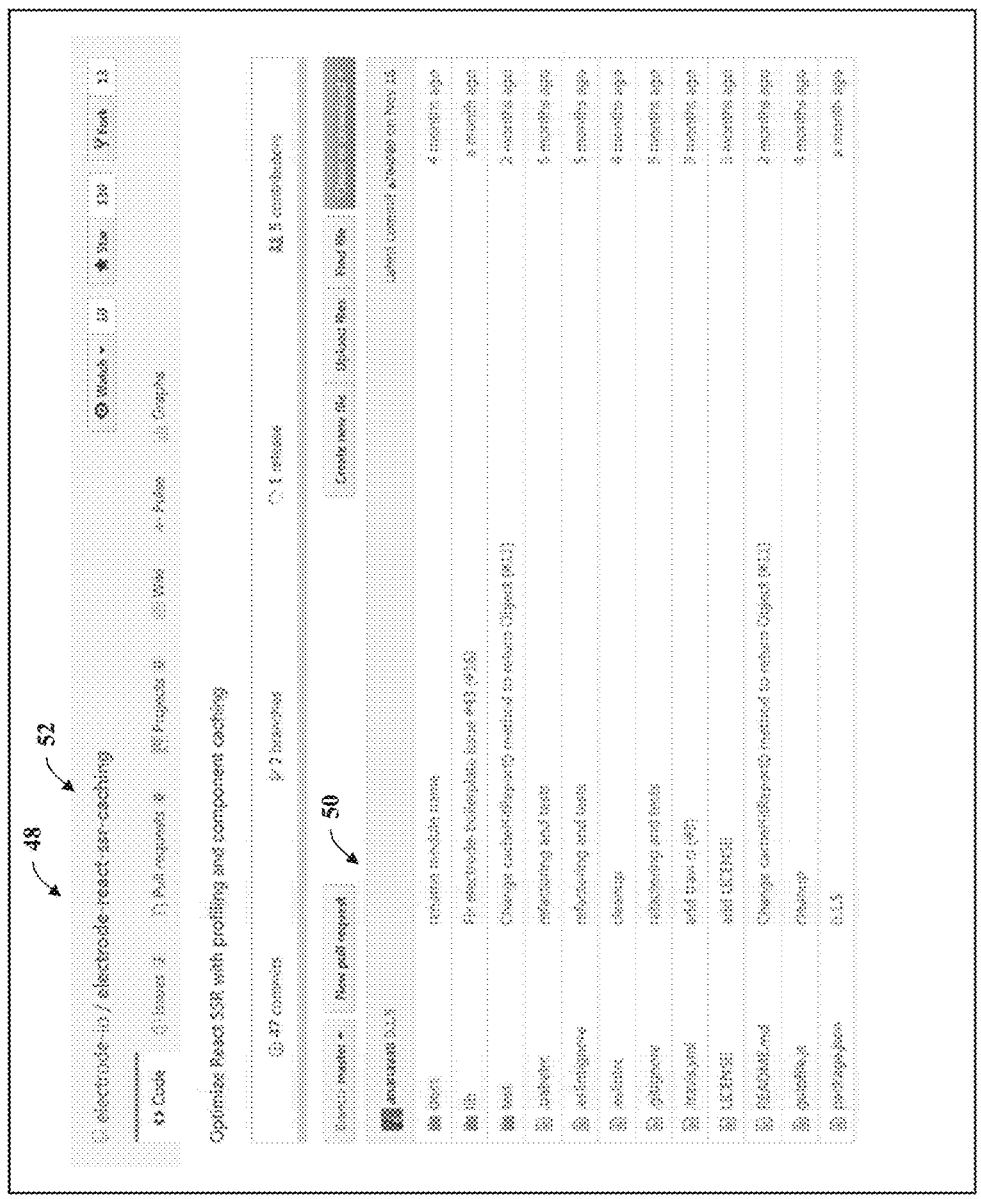
FIG. 12 is an illustration of an exemplary database record generated by the system shown in FIGS. 1-2, according to embodiments of the present invention.

For example, in one embodiment, the software component database 42 may contain a plurality of data repositories 48 (shown in FIG. 12). Each data repository 48 includes one or more software component data files 50 associated with software components. Each software component data file 50 includes information associated with the corresponding software component including, but not limited to, software code (shown in FIGS. 6-9E), source code, integration code, object data associated with a corresponding software component, and/or a unique component identifier 52 (shown in FIG. 12) such as, for example, a name, title, symbol, and/or any suitable unique identifier.

The website hosting server 38 is programmed to host a website including webpages 12 (shown in FIG. 5) that is accessible by a user via one or more client computing devices 44. The website hosting server 38 executes a website application program that retrieves software component data files 50 being stored in the component database 42 and uses the software components to render one or more webpages on a display device of a client computing device 44 in response to requests received from the user via the client computing device 44 to allow users to interact with the website and search and/or purchase products such as, for example, goods and/or services via the website. In one embodiment, the website hosting server 38 is configured to generate and display web pages associated with the website in response to requests being received from consumers via corresponding web browsers that are displayed on the client computing devices 44. For example, in one embodiment, the website hosting server 38 may host an e-commerce website and display a product search webpage 12 (shown in FIG. 5) in response to receiving a user request that allows a user to input a product search request including search criteria including one or more search terms and retrieve and display product information associated with one or more products 18 in response to the user's search request. The website hosting server 38 may also allow the user to select one or more of the displayed products for purchase.

In the illustrated embodiment, each software component 14 includes instructions for generating HTML code string that may be used to generate and display a website and/or webpage. For example, in one embodiment, upon receiving a request to display a webpage from a client computing device 44, the web site hosting server 38 may access the software component database 42, search one or more data repositories 48 and access the software component data files 50 to retrieve the software components 14 associated with the requested webpage. The website hosting server 38 may then execute a render-to-string operation to generate rendered code, such as, for example HTML code, using the instructions included with each software component 14, and transmit the rendered code to the client computing device 44. The web-browser program installed on the client computing device 44 executes the rendered code to generate and display webpage on the client computing device, including the webpage images and/or elements associated with software components 14.

Figure 2:
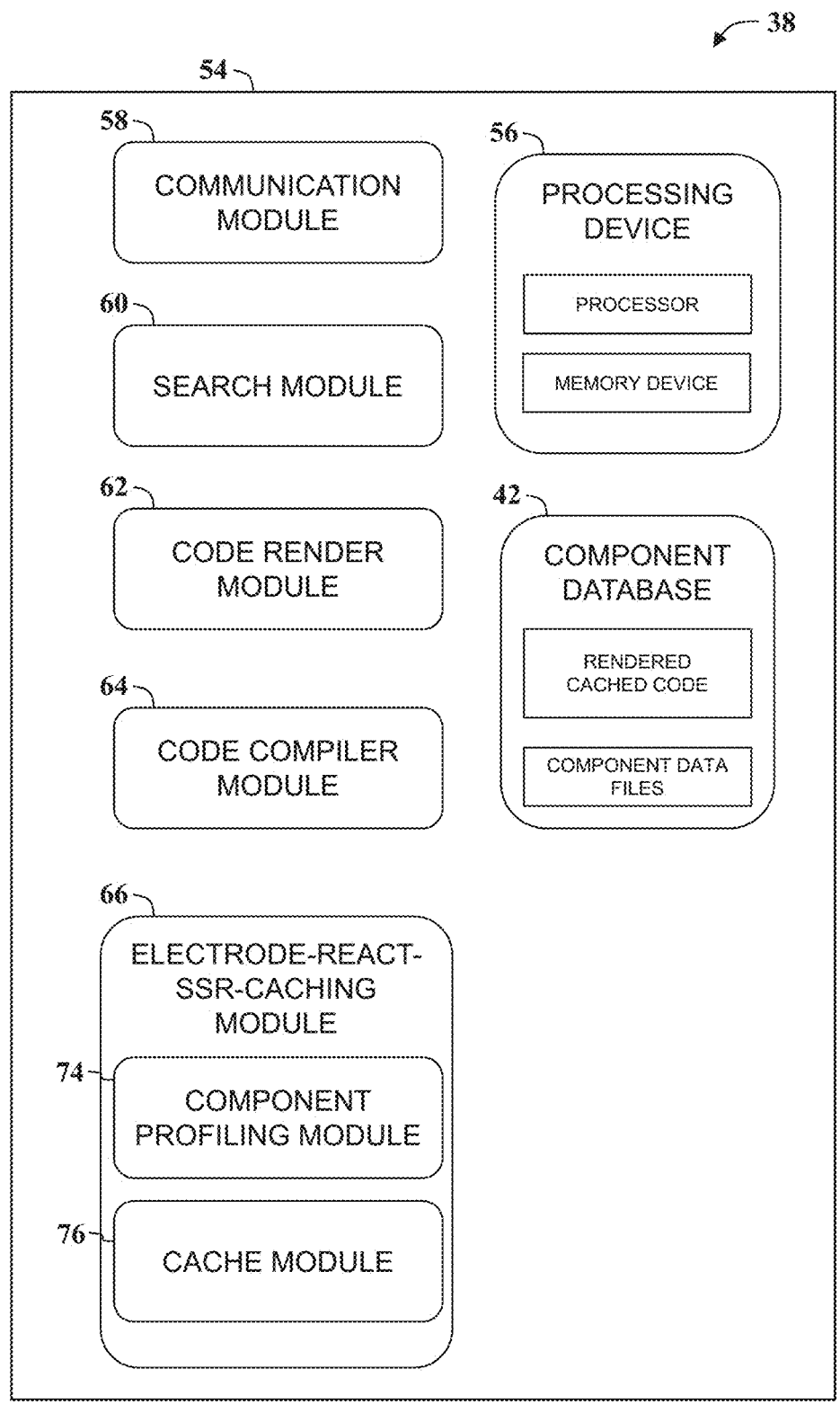
FIG. 2 is a schematic illustrating example components of a server computer that may be used with the system shown in FIG. 1, according to an embodiment of the present invention.

Referring to FIG. 2, in the illustrated embodiment, the website hosting server 38 includes a server computer 54 that includes a processing device 56 that is coupled to the component database 42, a communication module 58, a search module 60, a code render module 62, a code compiler module 64, and an electrode-react-ssr-caching module 66. The processing device 56 includes one or more processors that are coupled to a memory device. In addition, the processing device 56 executes various programs, and thereby controls components of the server computer 54 according to user instructions received from the client computing devices 44 to enable users to interact with an operate the server computer 54. For example, in the illustrated embodiment, the processor is programmed to retrieve a software components 14 being stored within the component database 42 and execute the instructions included with the software components 14 to cause the processor to generate rendered code and/or component code that may be transmitting to the client computing device 44 for use in generating and displaying a website and/or webpage on the client computing devices 44 using the web browser programmed installed on the client computing devices 44.

The communication module 58 retrieves various data and information from the component database 42 that may be used by the website hosting server 38 in generating information that is associated with the software components 14 and sends information to the client computing device 44 via the communications network 46 to cause the client computing device 44 to display a website on the client computing device 44 to enable the user to access and interact with the system 10 via the website.

The search module 60 is programmed to transmit a request to the database server 40 to access each data repository 48 being stored in the component database 42 and retrieve software component data files 50 including software components 14 associated with a requested webpage, and transmit the retrieved software components 14 to the code render module 62. For example, in one embodiment, the search module 60 may receive a request from a client computing device 44 such as, for example, a Uniform Resource Locator (url) associated with a webpage being transmitted from a web browser program being executed by the client computing device 44, and access the component database 42 to retrieve the software component 14 associated with the requested webpage 12. The search module 60 may then transmit the retrieved software components 14 to the code render module 62.

The code render module 62 is programmed to execute a render-to-string operation to generate code that may be transmitted to the client computing device 44 for use by the web-browser program to display a website and/or webpage on the client computing device 44. For example, in one embodiment, upon receiving a request to display a webpage from the client computing device 44, the code render module 62 may retrieve the software component 14 associated with the requested webpage from the component database 42 and/or receive the corresponding software components 14 from the search module 60. Each of the software components 14 include instructions for generating rendered code that may be used by the web-browser of the client computing device 44 to display the webpage 12. For example, in one embodiment, the retrieved software components 14 includes instructions for rendering HTML code string for use in displaying webpage elements and/or images associated with the software component 14. When the code render module 62 executes a render-to-string operation, the instructions included in the software component 14 causes the code render module 62 to generate the corresponding HTML code string. The code render module 62 transmits the rendered code and the component code to the code compiler module 64. The code compiler module 64 is configured to receive the rendered code and the component code from the code render module 62 and generate compiled code, and transmit the compiled code, including the rendered code and the component code to the client computing device 44.

The electrode-react-ssr-caching module 66 is configured to profile the software components 14 to determine a time to generate rendered HTML code associated with the software components 14. The electrode-react-ssr-caching module 66 is also configured to execute the software component code 28 to generate rendered cache code 68 (shown in FIGS. 8D and 9D) that may be stored in the database 42. In one embodiment, the rendered cache code 68 may include a rendered HTML code string 70 (shown in FIG. 8D) associated with the software component 14 that may be transmitting to the client computing device 44 for use in displaying the webpage 12. In another embodiment, the rendered cache code 68 may include template HTML code 72 (shown in FIG. 9D) that is stored in the database and may be used to generate an HTML code string 70 when a request to display a webpage 12 is received from a client computing device 44.

In the illustrated embodiment, the electrode-react-ssr-caching module 66 is configured to access the component database 42 and retrieve a plurality of software components 14 associated with a webpage 12. The electrode-react-ssr-caching module 66 executes a profiling operation including rendering each of the plurality of software components and determining a rendering period associated with each software component. The electrode-react-ssr-caching module 66 selects a cacheable software component from the plurality of software components as a function of the associated rendering periods, generates rendered cache code for the selected cacheable software component, and stores the rendered cache code in the database for use in generating the webpage.

In one embodiment, the electrode-react-ssr-caching module 66 is configured to execute the profiling operation including generating a rendered HTML code string for each software component and determine the associated rendering period required to generate the corresponding rendered HTML code string. In addition, the electrode-react-ssr-caching module 66 may generate the rendered cache code including generating a template HTML code including at least one token and generating a lookup table including a token value associated with the at least one token. For example, in one embodiment, the electrode-react-ssr-caching module 66 may be configured to In the illustrated embodiment, the electrode-react-ssr-caching module 66 is configured to receive a request from a client computing device 44 to display the webpage 12, and access the database 42 in response to receiving the request and retrieve the plurality of software components 14 associated with the webpage. The electrode-react-ssr-caching module 66 may also identify the cacheable software component included in the plurality of software components having corresponding rendered cache code and retrieve the corresponding rendered cache code from the database. The electrode-react-ssr-caching module 66 may also identify non-cached software components included in the plurality of software components that do not have corresponding rendered cache code and generate rendered code for each non-cached software components. The electrode-react-ssr-caching module 66 may also be configured to transmit the rendered code and the rendered cache code to the client computing device 44 for use in displaying the webpage 12 on the client computing device 44.

In one embodiment, the electrode-react-ssr-caching module 66 may access the database 42 and retrieve a lookup table associated with the rendered cache code including a token value associated with the at least one token, generate a rendered HTML code string including replacing the at least one token with the associated token value, and transmit the rendered HTML code string to the client computing device 44 for us in displaying the webpage 12.

In the illustrated embodiment, the electrode-react-ssr-caching module 66 includes a profiling module 74 and a caching module 76. The profiling module 74 is configured to determine the time required by the server computer 54 to generate rendered HTML code from a software component 14, and determine whether the software component 14 should be cached in memory. The caching module 76 is configured to cache one or more software components into memory by executing the instructions included in the software component code and generated rendered HTML code that may be stored in memory and accessed by the server computer when a requires to display a webpage including the software component is received. Upon receiving the request to display the webpage, the server computer 54 accesses the database and retrieves the cached HTML code, and transmits the HTML code to the client computing device. Because the HTML code associated with the software component is stored in the database, the rendering time required to generate and transmit the code required to display the webpage to the client computing device is significantly reduced.

In the illustrated embodiment, the profiling module 74 is configured to determine a period of time required by the server computer 54 to generate rendered code for one or more software components 14 associated with a webpage 12. The profiling module 74 is configured to execute a profiling operation including rendering one or more software components 14 and determining a rendering period associated with each software component 14. For example, in one embodiment, the profiling module 74 executes a profiling operation to generate a rendered HTML code string 70 for each software component 14 and determines the associated rendering period required to generate the corresponding rendered HTML code string 70. In one embodiment, the profiling module 74 is configured to execute the profiling operation code 78 shown in FIG. 7.

The caching module 76 is configured to select cacheable software components 14 as a function of the associated rendering periods, and generate rendered cache code for the selected cacheable software component, and store the rendered cache code in the database 42 for use in generating the webpage 12. The caching module 76 may also modify the corresponding software component code 28 to indicate that the software component 14 is a cacheable software component including corresponding rendered cache code being stored in the database 42. For example, the caching module 76 may be configured to select one or more cacheable software components 14 upon determining the associated rendering period is greater than, and/or equal to a predefined time period. In the illustrated embodiment, the caching module 76 is configured to implement a simple caching strategy to generate rendered cache code that may include an HTML code string 70 (as shown in FIG. 8D) and/or implement a template caching strategy to generate a template HTML code 72 (shown in FIG. 9D).

In one embodiment, referring to FIGS. 8A-8D, the caching module 76 may be configured to implement the simple caching strategy by executing a JSON.stringify on the software component's props, using cache component code 80 shown in FIG. 8A. The system 10 may also specify a callback in cacheConfig to return the key. For example, in one embodiment, the caching module 76 may execute the cache component code 80 and retrieve the component code 28 shown in FIG. 8B. The caching module 76 may execute a render operation to retrieve the component props 82 shown in FIG. 8C, and generate the HTML code string 70 shown in FIG. 8D. The caching module 76 then stores the generated HTML code string 70 in the database 42 and identifies the corresponding software component 14 as a cacheable software component 14.

Referring to FIGS. 9A-9D, in one embodiment, the caching module 76 may be configured to implement the template caching strategy which is more complex than the simple caching strategy, but flexible. The template caching strategy is similar to generating logic-less handlebars templates from the React™ software components and then use string Replace to process the template with different props. For example, the caching module 76 may implement the template caching strategy by executing the template cache code 84, shown in FIG. 9A, wherein preserveKeys includes a list of keys that should not be tokenized; preserveEmptyKeys includes a list of keys that should not be tokenized if they are empty string " "; ignoreKeys include a list of keys that should be completely ignored as part of the template cache key; and whiteListNonStringKeys includes a list of non-string keys that should be tokenized. When executed by the caching module 76, the template cache code 84 causes the caching module 76 to access the software component code 28 (shown in FIG. 9B), retrieve the component props 82 shown in FIG. 9C, and replace the values in the props 82 with tokens 86 (shown in FIG. 9C), with @0@ referring to props.name and a @1@ referring to props.message to generate the template HTML code 72 shown in FIG. 9D). The caching module 76 then caches the template HTML code 72 using the tokenized props as cache key. In addition, the caching module 76 generates a lookup table 88, shown in FIG. 9E, which includes prop values 90 and corresponding tokens 86 that may be used to generate rendered code of the corresponding software component 14 that may be transmitted to the client computing device 44 for use in displaying the webpage 12 including the corresponding software component 14. The caching module 76 may be configured to lookup the template from cache and use string replace to apply the values to generate the rendered HTML code.

Figure 10A:
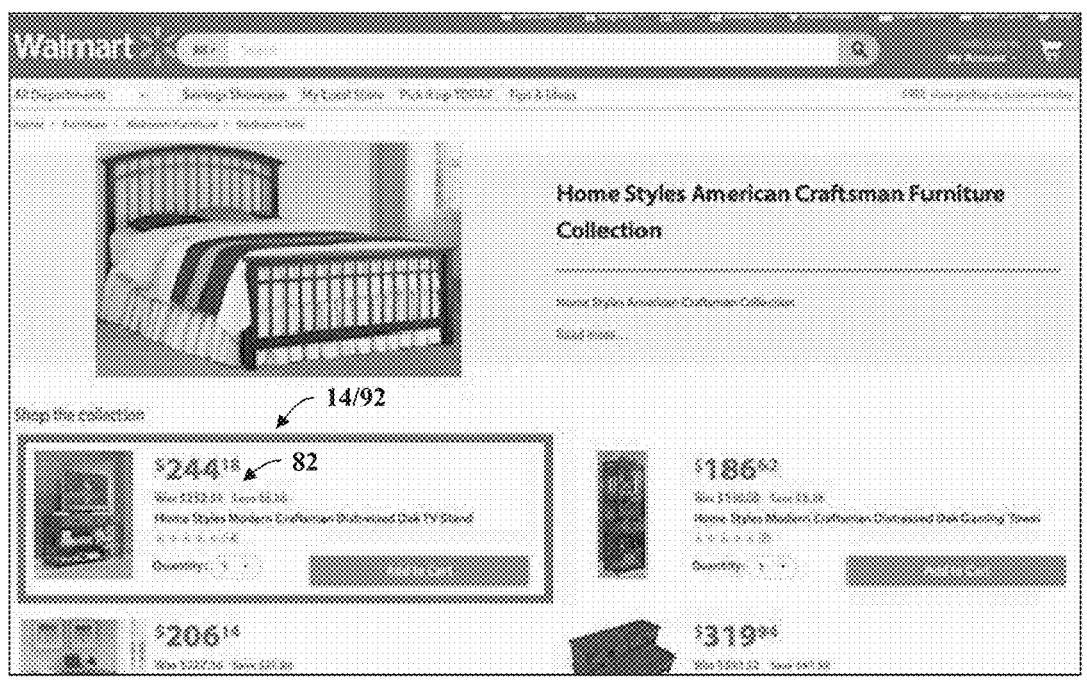
FIGS. 10A-10B are illustrations of an exemplary screenshot that may be generated by the system shown in FIGS. 1-2, according to embodiments of the present invention.
Figures 10B, 11:
FIG. 11 is an illustration of exemplary component caching computer code generated by the system shown in FIGS. 1-2, according to embodiments of the present invention.

Referring to FIGS. 10A-11, in one embodiment, the caching module 76 may execute the template cache code 84 to replace the prop values with special tokens instead of using the original props directly. With the template props, the caching module 76 creates the cache key using hash, and then renders the component. React SSR renderToString returns the HTML string with these special tokens inside, which can be considered a template HTML. As long as a component renders the same HTML structure with templates or actual props, the caching module 76 is able to cache and reuse the template HTML. The caching module 76 may also use string replacement to change the tokens to the real values. For example, FIG. 10A illustrates a webpage 12 including a software component including a product card 92. The caching module 76 may generate template HTML code 72 by modifying the software component code to replace the prices and title props 82 with tokens 86 such as {1}, {2}, {3}, etc., to generate the template HTML code for a product card 92 that may look like the image shown in FIG. 10B.

FIG. 11 illustrates a code sample that may be generated by the caching module 76 by turning a props 82 into a template. Note, that instead of using the string JSON paths as values in the template props, the caching module 76 uses one more indirection to have a lookup table 88 to refer back to the JSON path to get the original values 90 from props 82. The lookup table 88 adds more assurance that the string JSON path won't be affected in the generated HTML template, which would be smaller and cleaner. It also allows the JSON path to be kept as an array instead of as a string.

Figure 3:
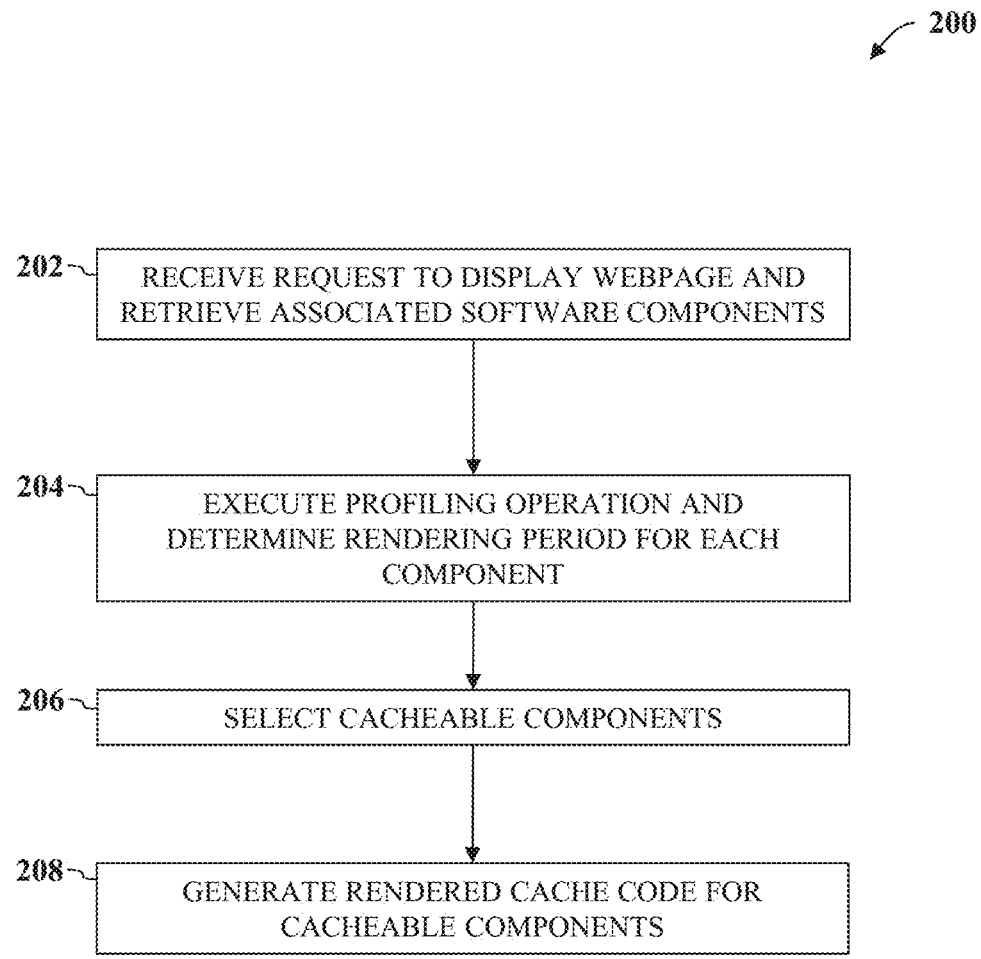
FIG. 3 is a flowchart of a method that may be used with the system shown in FIGS. 1-2, according to an embodiment of the present invention.
Figure 4:
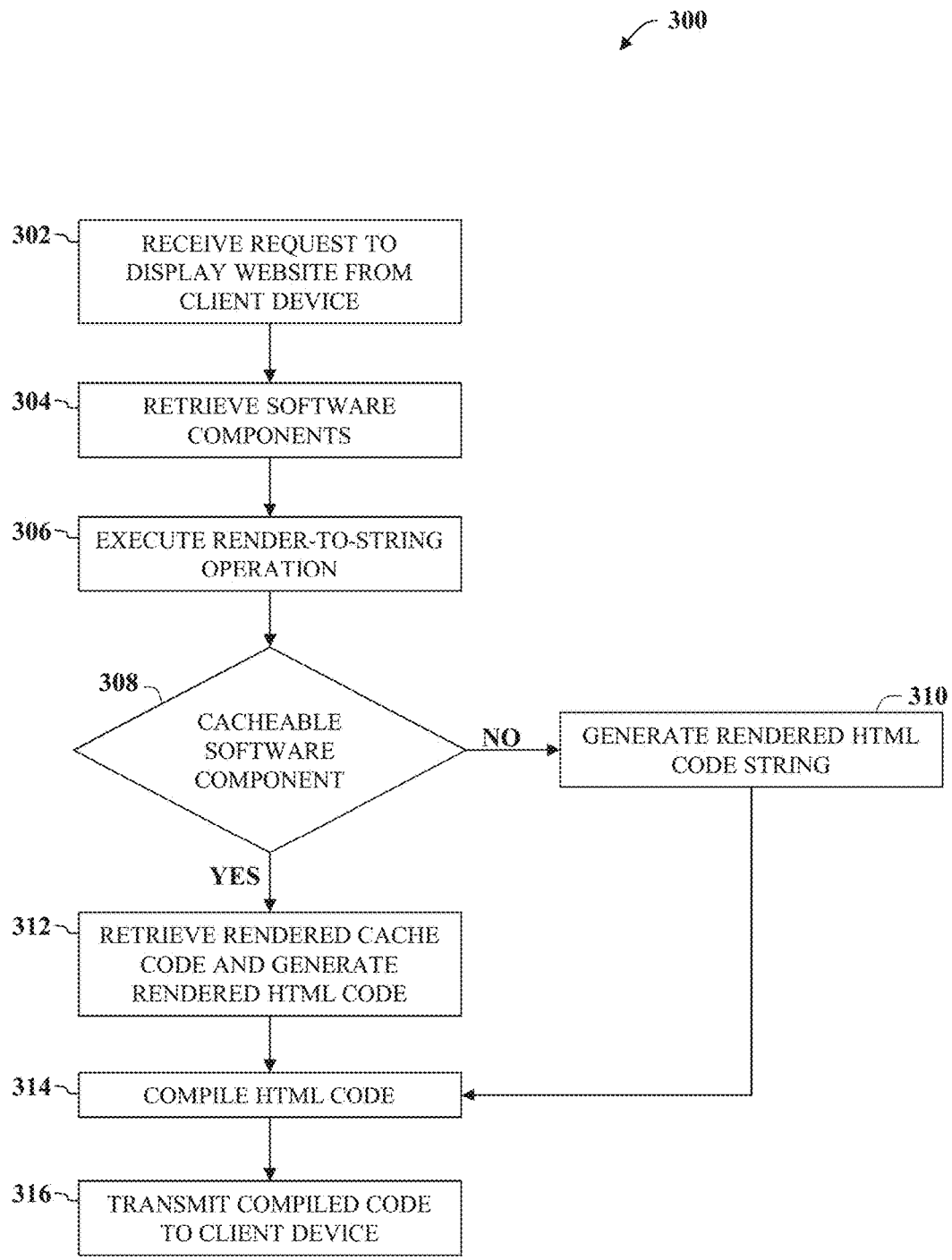
FIG. 4 is a flowchart of another method that may be used with the system shown in FIGS. 1-2, according to an embodiment of the present invention.

FIGS. 3 and 4 are flowcharts of methods 200 and 300 that may be used to operate the system 10 to display a webpage on a client computing device. The method includes a plurality of steps. Each method step may be performed independently of, or in combination with, other method steps. Portions of the methods may be performed by any one of, or any combination of, the components of the system 10. FIGS. 5-12 are exemplary graphical displays that may be displayed by the system 10.

Referring to FIG. 3, in the illustrated embodiment, in method step 202, the server computer 54 receives a request from a client computing device 44 to display a webpage 12. For example, in one embodiment, the server computer 54 may receive a url request associated with the webpage 12 from the client computing device 44. In response to receiving the request, the server computer 54 accesses the component database 42 and retrieves the software components 14 that may be used to generate webpage 12.

In method step 204, the server computer 54 executes a profiling operation including rendering each of the plurality of software components and determining a rendering period associated with each software component. In one embodiment, the server computer 54 may execute the profiling operation including generating a rendered HTML code string for each software component and determine the associated rendering period required to generate the corresponding rendered HTML code string.

In method step 206, the server computer 54 selects cacheable software components having associated rendering periods that are greater than and/or equal to a predefined time period.

In method step 208, the server computer 54 generates rendered cache code for the selected cacheable software component and stores the rendered cache code in the database 42 for use in generating the webpage. In one embodiment, the server computer 54 may execute the simple caching code 80 and generate a rendered HTML code string from the corresponding software component code and store the rendered HTML code string in the database 42. The server computer 54 may also execute the template caching code 84 and generate the rendered cache code including generating a template HTML code including at least one token and generating a lookup table including a token value associated with the at least one token, and storing the template HTML code and the lookup table in the database 42. The server computer 54 may also modify the corresponding software component code to identify the software component as a cacheable software component.

Referring to FIG. 4, in the illustrated embodiment, in method step 302, the server computer 54 receives a request from a client computing device 44 to display a webpage 12. For example, in one embodiment, the server computer 54 may receive a url request associated with the webpage 12 from the client computing device 44.

In method step 304, in response to receiving the request, the server computer 54 accesses the component database 42 and retrieves the software components 14 that may be used to generate webpage 12.

In method step 306, the server computer 54 executes a render-to-string operation to generate HTML string code that may be transmitted by the server computer 54 to the client computing device 44 for use by the client webbrowser program for displaying the webpage 12 on the client computing device 44.

In method step 308, the server computer 54 retrieve each software component 14 and determines if the retrieved software component 14 is a cacheable software component having corresponding rendered cache code stored in the database 42 or a non-cached software component that does not have corresponding rendered cache code stored in the database 42.

If the server computer 54 determines the software component 14 to be a non-cacheable software component, the server computer 54 implements method step 310 and executes the instructions included in the non-cacheable software component to generate a rendered HTML code string.

If the server computer 54 determines the software component 14 to be a cacheable software component, the server computer 54 implements method step 312 to retrieve the corresponding rendered cache code from the database 42 and generates a corresponding HTML code string.

In method step 314, the server computer 54 compiles the rendered HTML code. In method step 316, the server computer 54 transmits the compiled code to the client computing device 44. The compiled code causes the webbrowser program installed on the client computing device 44 to generate and display the webpage 12 using the received HTML code string.

INDUSTRIAL APPLICABILITY

In general, the system 10 includes an electrode-react-ssr-caching module that is configured to optimize React component server side rendering with profiling and software component caching. In the illustrated embodiment, the electrode-react-ssr-caching module includes a profiling module that is configured to execute profiling software code and a caching module that is configured to execute caching software code. The profiling module enables the system 10 to determine the time required to render a software component 14. The caching module enables the system 10 to cache a software component 14 to speed up server-side-rendering performance.

To come up with the data to apply the "template" strategy to cache some of the composite components, in full profiling code, the system may also capture and save the props. With this data, the system was used to experiment with caching some of the expensive components, and found a few cache profiles that work well. Even though many components may not work with caching, SSR time improved on average by 50% or more for product collection component on all the collection data.

In order to find the components that are good candidates for template strategy caching, the system was used to add automatic verification code in the caching code. The code would do a render with the real props and then lookup the cached version. If they match, then the component can be cached. Of course very few (in fact, none) match initially. The system was used to save the HTML strings and compare them using kDiff3 to fine tune the hashing for individual components. When fine tuning, a technique applied to both caching strategies, is to analyze the component props to identify and omit some keys that wouldn't affect the render output.

To verify that caching worked properly, the system was used to download all of the collections data from the walmart DB and rendered all of them with and without caching. Then the system was used to compare the results to make sure they are the same. To make the comparison work, the system was used to remove all the data-reactid and data-react-checksum attributes from the HTML string first. Some issues found with string values are that the component may apply encoding to the strings, but not always. One example of this is when the string values are used as attribute values in HTML tags and if the string contains single or double quotes, &, <, and >, then they are encoded. Another case is when the value is an URL, the component would remove any http: or https: prefix from them. For these, when restoring the prop values, the system was used to detect them and format the values also. Still, many components were found to be simply not cache-able. It's because their rendering logics heavily depend on the actual property values, which may be called "component cache-ability," which needs to improve for further performance gain on collection pages with caching.

Component Cache-ability: Out of the box, most components are not good candidates for caching. If a component props contains the children object, the system may avoid caching them. Components with props that have large variations, are not good for the "simple" strategy, and may be candidates for the "template" strategy, which also has limitations on what components can be applied.

For the "template" strategy, some basic reasons a component may not be cached are: It's hard (or impossible) to template non-string props since the code are more likely to have logic that depend on those values. Such as two execution paths based on a Boolean value, or a loop base on a number with different values. Even with strings props, the code could behave differently base on the value. For example, collection status could be "PUBLISHED" or "UNPUBLISHED" Also, the code could apply formatting to string values. If a complex component mixes prop value dependent logic with other rendering code, then the entire component is not cache-able. For example, if a component which will enable displaying stars based on customer reviews of a product. The component displays a half star for any partial decimal value above 0.4. There are about 10 different render outputs based on HTML structure. It'd be a good candidate for the "simple" strategy, but it's not cache-able since the average review value is a decimal and there is a large variation. It's significant to the component logic that decides whether to display a half star.

A very complex component that should be a good candidate for the "template" strategy is the product card component. It displays the product with an image, the product name, and the prices. The image URL and product name can easily be turned into a template, but not the prices, because the component breaks the price into dollar and cents amount, and displays them with different styles. If the system creates a new component that contains the logic to separate the prices first, then the rendering component would just do display only, which is then cache-able with the "template" strategy.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DBx, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. One or more non-transitory computer-readable storage media, having computer-executable instructions embodied thereon, wherein when executed by at least one processor, the computer-executable instructions cause the processor to:
    access a database and retrieve a plurality of React software components that generate elements of a webpage, wherein the plurality of React software components stored in the database are shared across multiple web applications;
    execute a profiling operation including rendering each of the plurality of React software components and determining a rendering period associated with the each of the plurality of React software components;
    select a cacheable software component from the plurality of React software components as a function of the associated rendering periods;
    generate rendered cache code for the selected cacheable software component; and
    store the rendered cache code in the database for use in generating the elements of the webpage.

2. The one or more non-transitory computer-readable storage media of claim 1, wherein each software component of the plurality of React software components includes instructions for generating HTML code.

3. The one or more non-transitory computer-readable storage media of claim 1, wherein the computer-executable instructions further cause the processor to:
    execute the profiling operation including generating a rendered HTML code string for the each of the plurality of React software components and determine the rendering period associated with the each of the plurality of React software components, the rendering period being a time period to generate the corresponding rendered HTML code string.

4. The one or more non-transitory computer-readable storage media of claim 1, wherein select the cacheable software component further comprises:
    when the rendering period associated with the each of the plurality of React software components is greater than a predefined time period, select the cacheable software component from the plurality of React software components as the function of the associated rendering periods.

5. The one or more non-transitory computer-readable storage media of claim 1, wherein generate rendered cache code further comprises:
    generating a template HTML code including at least one token; and
    generating a lookup table including a token value associated with the at least one token.

6. The one or more non-transitory computer-readable storage media of claim 1, wherein the computer-executable instructions further cause the processor to:
    receive a request from a client computing device to display the webpage;
    access the database in response to receiving the request and retrieve the plurality of React software components to generate the elements of the webpage;
    identify the cacheable software component included in the plurality of React software components having corresponding rendered cache code;
    retrieve the corresponding rendered cache code from the database;
    identify non-cached software components included in the plurality of React software components that do not have the corresponding rendered cache code;
    generate rendered code for each of the non-cached software components; and
    transmit the rendered code and the corresponding rendered cache code to the client computing device for use in displaying the webpage on the client computing device.

7. The one or more non-transitory computer-readable storage media of claim 6, wherein the rendered cache code includes a template HTML code including at least one token, and the computer-executable instructions further cause the processor to:
    access the database and retrieve a lookup table associated with the rendered cache code, the lookup table including a token value associated with the at least one token;
    generate a rendered HTML code string including replacing the at least one token with the token value associated with the at least one token; and
    transmit the rendered HTML code string to the client computing device for use in displaying the webpage on the client computing device.

8. A computer-implemented method for operating a server computer system for use in displaying a webpage on a client computing device, including the server computer performing steps of:
    accessing a database and retrieve a plurality of React software components that generate elements of the webpage, wherein the plurality of React software components stored in the database are shared across multiple applications;
    executing a profiling operation including rendering each of the plurality of React software components and determining a rendering period associated with the each of the plurality of React software components;
    selecting a cacheable software component from the plurality of React software components as a function of the associated rendering periods;
    generating rendered cache code for the selected cacheable software component; and
    storing the rendered cache code in the database for use in generating the elements of the webpage.

9. The computer-implemented method of claim 8, wherein each software component of the plurality of React software components includes instructions for generating HTML code.

10. The computer-implemented method of claim 8, further comprises:
    executing the profiling operation including generating a rendered HTML code string for the each of the plurality of React software components and determine the rendering period associated with the each of the plurality of React software components, the rendering period being a time period to generate the corresponding rendered HTML code string.

11. The computer-implemented method of claim 8, further comprises:
when the rendering period associated with the each of the plurality of React software components is greater than a predefined time period, select the cacheable software component from the plurality of React software components as the function of the associated rendering periods.

12. The computer-implemented method of claim 8, further comprises:
generating a template HTML code including at least one token and generating a lookup table including a token value associated with the at least one token.

13. The computer-implemented method of claim 8, further comprises:
receiving a request from a client computing device to display the webpage;
accessing the database in response to receiving the request and retrieve the plurality of React software components to generate the elements of the webpage;
identifying the cacheable software component included in the plurality of React software components having corresponding rendered cache code;
retrieving the corresponding rendered cache code from the database;
identifying non-cached software components included in the plurality of React software components that do not have the corresponding rendered cache code and generate rendered code for each of the non-cached software components; and
transmitting the rendered code and the corresponding rendered cache code to the client computing device for use in displaying the webpage on the client computing device.

14. The computer-implemented method of claim 13, wherein the corresponding rendered cache code includes a template HTML code including at least one token, the computer-implemented method further comprising:
accessing the database and retrieve a lookup table associated with the corresponding rendered cache code, the lookup table including a token value associated with the at least one token;
generating a rendered HTML code string including replacing the at least one token with the token value associated with the at least one token; and
transmitting the rendered HTML code string to the client computing device for use in displaying the webpage on the client computing device.

15. A system for use in generating a webpage, comprising:
a database including a plurality of React software components that generate elements of the webpage, wherein the plurality of React software components stored in the database are shared across multiple applications;
a server computer including a processor configured to:
access the database and retrieve the plurality of React software components;
execute a profiling operation including rendering each of the plurality of React software components and determining a rendering period associated with the each of the plurality of React software components;
select a cacheable software component from the plurality of React software components as a function of the associated rendering periods;
generate rendered cache code for the selected cacheable software component; and
store the rendered cache code in the database for use in generating the elements of the webpage.

16. The system of claim 15, wherein each software component of the plurality of React software components includes instructions for generating HTML code, the server computer is configured to:
execute the profiling operation including generating a rendered HTML code string for the each of the plurality of React software components and determine the rendering period associated with the each of the plurality of React software components, the rendering period being a time period to generate the corresponding rendered HTML code string.

17. The system of claim 15, wherein:
when the rendering period associated with the each of the plurality of React software components is greater than a predefined time period, select the cacheable software component from the plurality of React software components as the function of the associated rendering periods.

18. The system of claim 15, wherein:
generate a template HTML code including at least one token; and
generate a lookup table including a token value associated with the at least one token.

19. The system of claim 15, further comprises:
receive a request from a client computing device to display the webpage;
access the database in response to receiving the request and retrieve the plurality of React software components to generate the elements of the webpage;
identify the cacheable software component included in the plurality of React software components having corresponding rendered cache code;
retrieve the corresponding rendered cache code from the database;
identify non-cached software components included in the plurality of React software components that do not have the corresponding rendered cache code and generate rendered code for each of the non-cached software components; and
transmit the rendered code and the corresponding rendered cache code to the client computing device for use in displaying the webpage on the client computing device.

20. The system of claim 19, wherein the rendered cache code including a template HTML code including at least one token further comprises:
access the database and retrieve a lookup table associated with the rendered cache code, the lookup table including a token value associated with the at least one token;
generate a rendered HTML code string including replacing the at least one token with the token value associated with the at least one token; and
transmit the rendered HTML code string to the client computing device for use in displaying the webpage on the client computing device.

* * * * *